United States Patent
Ramsey (10) Patent No.: US 7,593,845 B2
(45) Date of Patent: Sep. 22, 2009

(54) METHOD AND APPARATUS FOR IDENTIFYING SEMANTIC STRUCTURES FROM TEXT

(75) Inventor: William D. Ramsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 753 days.

(21) Appl. No.: 10/679,556

(22) Filed: Oct. 6, 2003

(65) Prior Publication Data

US 2005/0075859 A1 Apr. 7, 2005

(51) Int. Cl.
*G06F 17/27* (2006.01)

(52) U.S. Cl. ............... 704/9; 704/200; 704/255; 704/256; 704/257; 706/20; 707/3; 707/6; 714/38

(58) Field of Classification Search ........... 704/9, 704/200, 255, 256, 257; 707/3, 6; 706/20; 714/38
See application file for complete search history.

(56) References Cited

U.S. PATENT DOCUMENTS

| | | | | |
|---|---|---|---|---|
| 4,635,199 A | * | 1/1987 | Muraki | 704/2 |
| 5,230,037 A | * | 7/1993 | Giustiniani et al. | 704/200 |
| 5,414,836 A | * | 5/1995 | Baer et al. | 714/38 |
| 5,418,717 A | * | 5/1995 | Su et al. | 704/9 |
| 5,748,840 A | * | 5/1998 | La Rue | 704/264 |
| 5,778,341 A | * | 7/1998 | Zeljkovic | 704/256 |
| 5,781,879 A | * | 7/1998 | Arnold et al. | 704/9 |
| 5,873,056 A | * | 2/1999 | Liddy et al. | 704/9 |
| 5,907,841 A | * | 5/1999 | Sumita et al. | 707/6 |
| 5,987,414 A | * | 11/1999 | Sabourin et al. | 704/270 |
| 6,076,051 A | * | 6/2000 | Messerly et al. | 704/9 |
| 6,112,168 A | * | 8/2000 | Corston et al. | 704/9 |
| 6,233,557 B1 | * | 5/2001 | Poppert | 704/250 |
| 6,314,399 B1 | * | 11/2001 | Deligne et al. | 704/257 |
| 6,480,819 B1 | * | 11/2002 | Boman et al. | 704/9 |

(Continued)

FOREIGN PATENT DOCUMENTS

EP 0 387 226 A 9/1990

OTHER PUBLICATIONS

Tjing-Shin Chang et al., "GPSM: A Generalized Probabilistic Semantic Model for Ambiguity Resolution," Meeting of the Association for Computational Linguistics, 1992, pp. 177-184.

(Continued)

*Primary Examiner*—Richemond Dorvil
*Assistant Examiner*—Michael C Colucci
(74) *Attorney, Agent, or Firm*—Theodore M. Magee; Westman, Champlin, & Kelly, P.A.

(57) ABSTRACT

A method and apparatus for identifying a semantic structure from an input text forms at least two candidate semantic structures. A semantic score is determined for each candidate semantic structure based on the likelihood of the semantic structure. A syntactic score is also determined for each semantic structure based on the position of a word in the text and the position in the semantic structure of a semantic entity formed from the word. The syntactic score and the semantic score are combined to select a semantic structure for at least a portion of the text. In many embodiments, the semantic structure is built incrementally by building and scoring candidate structures for a portion of the text, pruning low scoring candidates, and adding additional semantic elements to the retained candidates.

12 Claims, 9 Drawing Sheets

U.S. PATENT DOCUMENTS

| | | | |
|---|---|---|---|
| 6,662,159 B2 * | 12/2003 | Komori et al. | 704/255 |
| 6,714,941 B1 * | 3/2004 | Lerman et al. | 707/103 R |
| 7,035,802 B1 * | 4/2006 | Rigazio et al. | 704/256 |
| 7,117,144 B2 * | 10/2006 | Goodman et al. | 704/9 |
| 7,177,799 B2 * | 2/2007 | Calcagno et al. | 704/9 |
| 2002/0169598 A1 | 11/2002 | Minker | 704/9 |
| 2003/0014399 A1 * | 1/2003 | Hansen et al. | 707/3 |
| 2003/0088581 A1 * | 5/2003 | Maze et al. | 707/104.1 |
| 2004/0220892 A1 * | 11/2004 | Cohen et al. | 706/20 |

OTHER PUBLICATIONS

Key=Yih Su et al., "Syntactic and Semantic Aspects of Score Function," Proceedings of the 12$^{th}$ International Conference on Computational Linguistics, Aug. 1988, pp. 642-644.

Daniel Gildea et al., "Automatic Labeling of Semantic Roles," Computational Linguistics, vol. 28, No. 3, 2002, pp. 245-288.

Michael Collins et al., "Semantic Tagging Using a Probabilistic Context Free Grammar," Proceedings of Workshop on Very Large Corpora, Aug. 15, 1997, pp. 38-48.

European Search Report from Application No. 04103457.0 filed Jul. 20, 2004.

Examination Report of Corresponding European Application No. 04 103 457.0-1527, filed Mar. 27, 2009.

Alabiso, B. et al. "LEAP: Language Enabled Applications," Proceedings of the First Workshop on Human-Machine Conversation, Bellagio, Italy (Jul. 1997).

Lavie, A., "GLR*: A Robust Parser for Spontaneous Spoken Language," Proceedings of ESSLLI-96 work-shop on Robust Parsing, Prague, Czech Republic (Aug. 1996).

Miller, S. et al., "Hidden Understanding Models of Natural Language," Proceedings of the 31$^{st}$ Annual Meeting of the Association for Computational Linguistics, New Mexico State University (1994).

Ward, W., "The CMU Air Travel Information Service: Understanding Spontaneous Speech," Proceedings of the DARPA Speech and Natural Language Workshop (1990).

Ward, W. "Understanding Spontaneous Speech: the Phoenix System," IEEE International Conference on Acoustics, Speech and Signal Processing (1991).

Microsoft Speech SDK with SAPI 5.0, 94 pages (Sep. 1999).

Wang, K., "Implementation of Multimodal Dialog System Using Extended Markup Languages," 6 pages (undated).

Wang, K., "A Plan-based Dialog System With Probabilistic Inferences," 5 pages, 2000.

Wang, K., "An Event-Driven Model for Dialogue System," Proc. ICSLP-98, (Dec. 1998).

Gorrin, A. et al., "How May I Help You?" Speech Communications, vol. 23, (1997).

"A Stochastic Model of Human-Machine Interaction for Learning Dialog Strategies," IEEE Transactions on Speech and Audio Processing, vol. 8, No. 1, pp. 11-23, (Jan. 2000).

"The Thoughtful Elephant: Strategies for Spoken Dialog Systems," IEEE Transactions on Speech and Audio Processing, vol. 8, No. 1, pp. 51-62, (Jan. 2000).

"Jupiter: A Telephone-Based Conversational Interface for Weather Information," IEEE Transactions on Speech and Audio Processing, vol. 8, No. 1, pp. 85-96, (Jan. 2000).

Wang, Y. "Robust Language Understanding in MIPAD," 4 pages (undated).

Weimer-Hastings, Peter and Zipitria, Iraide, "Rules for Syntax, Vectors for Semantics," In: Proceedings of the Twenty-Third Annual Conference of the Cognitive Science Society, 1991.

Wang, Ye-Yi, "A Robust Parser for Spoken Language Understanding," Eurospeech 1999.

Wang, Ye-Yi, "Robust Language Understanding in Mipad," ICASSP, 2001.

* cited by examiner

```
                    ┌─ 400
<Schema> ─S
    ┌─<Entity Type="Flight" BaseName="Flight" Seen="121" >
    S      <With Type="Default" EntityType="Flight_Field" Seen="9" />
404        <With Type="Default" EntityType="BetweenDollars" />
           <With Type="Default" EntityType="BetweenTime" />
           <With Type="Default" EntityType="Class_Type"
               Saturate="true" Seen="13" />
           <With Type="Default" EntityType="EarlyOrLate" Seen="4" />
           <With Type="Default" EntityType="Fare" Saturate="true" Seen="9" />
           <With Type="Default" EntityType="FlightNumber" Seen="1" />
           <With Type="Default" EntityType="LargestSmallest" Seen="2" />
           <With Type="Default" EntityType="Meals" Saturate="true" Seen="1" />
           <With Type="Default" EntityType="Num_Stops"
               Saturate="true" Seen="2" />
           <With Type="Default" EntityType="One_Way" Seen="8" />
408 ~S~    <With Type="Default" EntityType="TimeEntity"
               Saturate="true" Seen="38" />
410 ~S~    <With Type="Goal" EntityType="City" Suggested="true"
               Prompt="Where do you want to go today?" Seen="82" />
412 ~S~    <With Type="Source" EntityType="City" Suggested="true"
               Prompt="From where?" Seen="99" />
414 ─┐     <With Type="Topic" EntityType="Aircraft" />
     └─    <With Type="Topic" EntityType="Airline" Seen="39" />
416 ─┐    <With Type="Via" EntityType="City" Seen="11" />
           <Denoted Seen="13">flight</Denoted>
418 ~S~    <Denoted Seen="79">flights</Denoted>
           <Denoted >plane</Denoted>
           <Denoted Seen="1">ticket</Denoted>
           <Tagging>Flight</Tagging>
406 ~S~ </Entity>

430~S~ <TransitionProb R1="Goal" E1="City" R2="Source" E2="City" Seen ="2" />

432 ~S~ <TransitionProb R1="Source" E1="City" R2="Goal" E2="City" Seen ="69" />

420 ~L~ <GrammarRule Strong="True" LOM="False" Contiguous="False" >
        428 ~S~ <Constit Number="0" Entity="DaysOfWeek" Restriction="NULL"/>
422 ─┐          <Parent Entity="TimeEntity"/>
     └─ </GrammarRule>
424 ~S~ <GrammarRule Strong="True" LOM="False" Contiguous="False" >
                <Constit Number="0" Entity="CityName" Restriction="NULL"/>
                <Parent Entity="City"/>
426 ─┐ </GrammarRule>

┌─ 402
        </Schema> ─S                                    FIG. 4
```

METHOD AND APPARATUS FOR IDENTIFYING SEMANTIC STRUCTURES FROM TEXT

BACKGROUND OF THE INVENTION

The present invention relates to natural language processing. In particular, the present invention relates to processing text to identify the semantics of the text.

The goal of natural language processing is to decipher the meaning or semantics of a free-form linguistic input. Some systems attempt to identify the semantics of a natural language input by applying semantic rules directly to the individual words in the input. Since words can have multiple meanings, these rules are very complex and difficult to develop. For example, the word "room" can be a verb as in "Bill asked if he could room with Jake" or a noun as in "The table is in the living room". To determine which sense of the word is being used, the rules have to determine what other words are present in the text. Because a large number of words can be used with each sense of a word, a large number of rules are needed. As a result, a direct application of semantic rules to words in the text is considered to be unworkable in many environments.

To reduce the number of rules that are needed, many systems perform a syntactic analysis to identify the parts of speech of the words in the text and the syntactic relationships between the words before identifying the semantics of the text. The parts of speech can then be used as conditions in the rules instead of using the words directly. Thus, instead of having to list every possible noun in a rule, the rule can be written to simply require a noun. This normalization greatly reduces the complexity of the semantic rules.

However, using a separate syntactic parse produces a two-stage evaluation process in which the content of the entire sentence must be fully considered in each stage. This makes the process slow. In addition, if the syntactic parse fails due to a poorly formed, fragmentary, or erroneous input, the semantic process will also fail.

In addition, the semantic rules have been difficult to write because they have been written as a series of logical comparisons and operations. This makes the addition of new semantic structures time consuming.

SUMMARY OF THE INVENTION

A method and apparatus for identifying a semantic structure from an input text forms at least two candidate semantic structures. A semantic score is determined for each candidate semantic structure based on the likelihood of the semantic structure. A syntactic score is also determined for each semantic structure based on the position of a word in the text and the position in the semantic structure of a semantic entity formed from the word. The syntactic score and the semantic score are combined to select a semantic structure for at least a portion of the text. In many embodiments, the semantic structure is built incrementally by building and scoring candidate structures for a portion of the text, pruning low scoring candidates, and adding additional semantic elements to the retained candidates.

BRIEF DESCRIPTION OF THE DRAWINGS

FIG. 4 is an example of a portion of a schema that defines semantic types, Markov probabilities, and semantic rules under one embodiment of the present invention.

DETAILED DESCRIPTION OF ILLUSTRATIVE EMBODIMENTS

Figure 1:
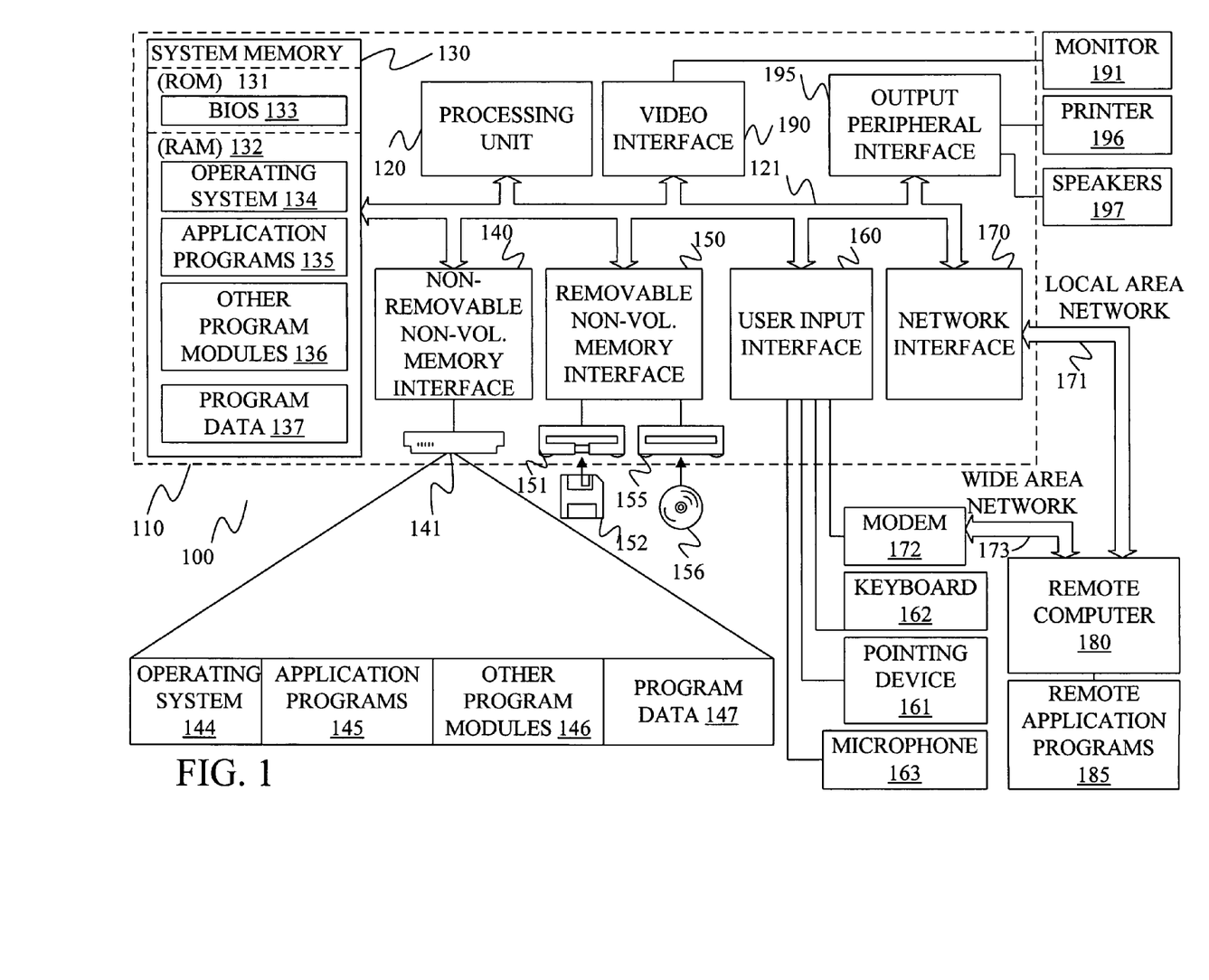
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

The present invention provides a method and apparatus for efficiently identifying semantic structures in an input text even if the input text is poorly formed or fragmented. A block diagram showing the system of the present invention is presented in FIG. 2 and a method for identifying a semantic structure is shown in the flow diagram of FIG. 3.

Figure 3:
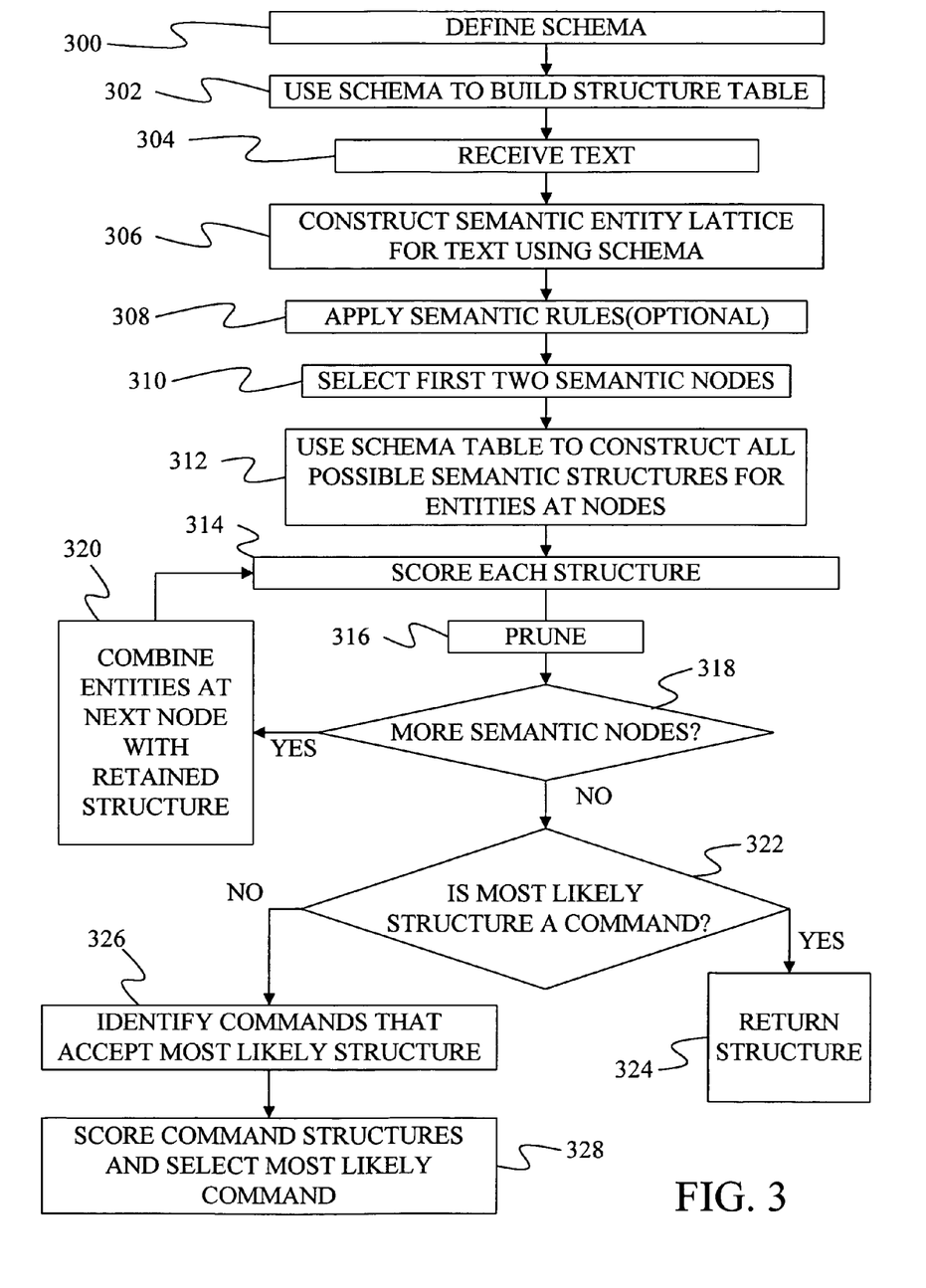
FIG. 3 is a flow diagram of a method of identifying semantic structures under one embodiment of the present invention.

In step 300 of FIG. 3, a schema 200 is defined that includes semantic types and probabilities 202, Markov probabilities 204, and semantic rules 206. An example of a portion of a schema is shown in FIG. 4.

In FIG. 4, the schema is defined using an XML format that begins with <Schema> tag 400 and ends with </Schema> tag 402. A semantic type is defined within <Entity> tags such as <Entity> tags 404 and 406. Within the opening <Entity> tag, the identity of the entity is listed as the value for the "Type" attribute. For instance, for <Entity> tag 400, the entity is identified as "Flight". The opening <Entity> tag also contains a "seen" attribute, which indicates the number of times this entity occurred in a set of training data. For example, the "Flight" entity was seen one-hundred twenty-one times in the training data.

Between the opening and closing <Entity> tags, a set of <With> tags can be found such as <With> tags 408, 410, 412, 414, and 416. Each <With> tag includes an attribute of "EntityType" that identifies an entity that can appear as a child entity for the entity listed in the opening <Entity> tag. For example, <With> tag 408 indicates that a "TimeEntity" can appear as a child entity to the "Flight" entity found in tag 404. Each <With> tag also includes a "Seen" attribute that indicates the number of times the entity of the <With> tag was found as a child entity to the entity in the <Entity> tag. For example, tag 414 indicates that the "Airline" entity was found as a child entity of "Flight" thirty-nine times.

Some entities in a <With> tag are further defined by a restriction set in a "Type" attribute. For example, <With> tags 410 and 412 are both for an entity of "City". However, tag 410 is restricted to a city that is a "goal" or destination for a trip, while tag 412 is restricted to a city that is a "source" or origin of a trip.

Another tag within the <Entity> tag is the <Denoted> tag. A word or phrase between two <Denoted> tags is a word or phrase that appeared in the training data and was associated with this entity. For example, the word "flights" was found in the training text and was associated with the "flight" entity as indicated by <Denoted> tag 418. A <Denoted> tag can include a "seen" attribute that indicates the number of times the word or phrase between the <Denoted> tags was associated with this entity. For example, the word "flights" was associated with the "flight" entity seventy-nine times.

Returning to FIG. 3, after the schema has been defined, it used in step 302 by a table construction unit 208 to construct a semantic structure table 210. Specifically, the semantic types 202 that are defined between <Entity> tags in the schema are used to construct semantic structure table 210.

Structure table 210 consists of a separate entry for each possible pair of entities in the schema. Each entry includes a listing of all of the structures that can be built in which both entities will be present. Note that these structures include structures where the two entities are directly linked together and structures where the two entities are connected through another entity. For example, one entity may be the grandchild of another entity such that there is an entity between them or the two entities may share a common ancestor entity. Only those entities that are required to form the connection between the two entities are listed for any one structure in the table. By creating this table initially, the present invention reduces the number of computations that must be done at run time to identify the different ways in which two entities may be connected together under the schema.

At step 304, a text 212 is received by a semantic entity identifier 214, which identifies all of the entities that could be represented by the text at step 306. To do this, entity identifier utilizes the <Denoted> tags in the <entity> tags of schema 200. If a word or phrase from the text is found in a pair of <Denoted> tags, a semantic node is created for the word or phrase and the entity that included the <Denoted> tag is added as a possible entity for the node. Note that a single node may have multiple entities. Also, if the span of two entities (the words or phrase associated with the entities) partially overlap, they are considered to be part of the same semantic node. The result is a semantic entity lattice.

Figure 5:
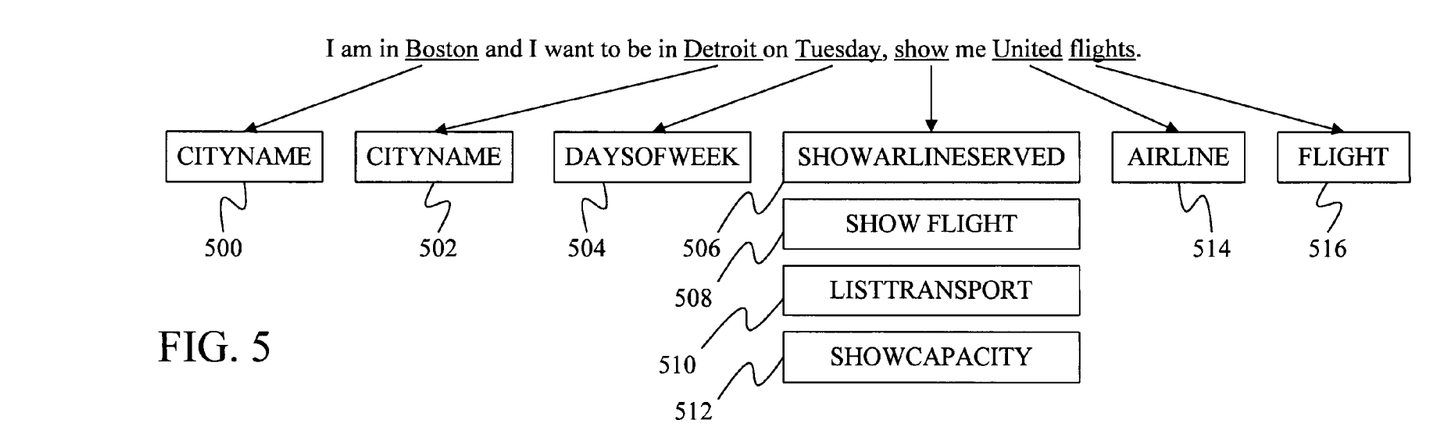
FIG. 5 is a diagram showing the creation of semantic entities from an input text.

FIG. 5 provides a diagram showing an example entity lattice formed through step 306. In FIG. 5, the poorly formed input sentence "I am in Boston and I want to be in Detroit on Tuesday, show me United flights" is processed to identify the entity lattice. During this process, "Boston" and "Detroit" are mapped to two separate "cityname" entities 500 and 502, which represent two sequential semantic nodes. "Tuesday" is mapped to a "daysofweek" entity 504 at a third semantic node. The word "show" is mapped to four possible entities that overlap at the fourth node. Specifically, "show" is mapped to "ShowAirlineServed" entity 506, "ShowFlight" entity 508, "ListTransport" entity 510, and "ShowCapacity" entity 512. The words "United" and "flights" are mapped to "Airline" entity 514 and "Flight" entity 516, respectively, which represent the last two semantic nodes in the lattice.

At step 308, semantic rules 206 are applied to the entities identified in step 306. Examples of such semantic rules are shown in the example schema of FIG. 4 between <GrammarRule> tags such as <GrammarRule> tags 420 and 422 and <GrammarRule> tags 424 and 426.

Between each pair of <GrammarRule> tags are one or more <Constit> tags such as <Constit> tag 428. Each <Constit> tag represents an entity that is identified within the <Constit> tag by an "Entity" attribute. To determine if a particular grammar rule should execute, the entity lattice formed in step 306 is examined to see if all of the entities listed within the <Constit> tags of the rule are present in separate semantic nodes along the lattice. Under some embodiments, the entities must appear in the lattice in the same order as the <Constit> tags. For example, if a grammar rule contains the following sequence of tags:

<Constit Number="0" Entity="Number"/>
<Constit Number="1" Entity="Flight"> then a "Number" entity must appear to the left of a "Flight" entity in the entity lattice in order for the grammar rule to execute.

As shown above, the <Constit> tags also include a "Number" attribute. This attribute assigns a value to the entity that can be used to identify the entity during execution of the rule. This value is needed since two entities of the same entity type can be used in a single grammar rule.

In general, each grammar rule combines the constituent entities found in the <Constit> tags to form a new entity in which the constituent entities are embedded. One type of grammar rule forms a parent entity where each constituent entity becomes a child to the parent entity. Such rules utilize a <Parent> tag with an "Entity" attribute that identifies the entity to be used as the parent. When this tag is encountered and the entities of the <Constit> tag are present in the entity lattice, the individual entities of the <Constit> tags are removed and a semantic structure is generated in which the entities of the <Constit> tag become child entities to the entity found in the <Parent> tag. The span of this structure is then the combination of the span of the child entities.

The grammar rules may include more complicated structure formations in which the entities of the <Constit> tags are combined through multiple level structures or the attributes of an entity are changed or an entity itself is changed. Such rules include a <Rule> tag that designates the final structure to be formed from the constituent entities using the values assigned through the "number" attribute of the <Constit> tags. For example:

<Constit Number="0" Entity="City"
  Restriction="Source"/>

<Constit Number="1" Entity="City"
  Restriction="Goal"/>

<Constit Number="2" Entity="City"
  Restriction="Goal"/>

```
<Rule>{Flight[(Source,City,0)(Via,City,1)
    (Goal,City,2)]}</Rule>
``` creates a "Flight" structure with a parent "Flight" entity, a child source city entity that is filled with the city entity designated as entity "0", a child via city entity that is filled with the city entity designated as entity "1", and a child goal city entity that is filed with the city entity designated as entity "2". Note that in this rule, the city entity designated as entity "1" is changed from a "goal" entity to a "via" entity.

In the example above, the "Restriction" attribute is a special type of entity. Like other entities, a restriction entity includes <Denoted> tags in its definition that indicate which words will generate the entity. For example, a "Goal" restriction entity is denoted by the word "to" or the phrase "arriving at". Restriction entities differ from other entities in that they modify another entity on the same level in the structure. Thus, Goal, Source, and Via modify a City entity. Together, the restriction entity and the entity being modified form a single entity with a restriction. In the discussion below, the restriction entity is often referred to as just a restriction.

In the schema, if an entity accepts another entity with a restriction, the restriction is identified using the "Type" attribute in the <With> tag. For example, <With> tag 416 indicates that the "Flight" entity accepts a "City" entity with a "Via" restriction.

Figure 6:
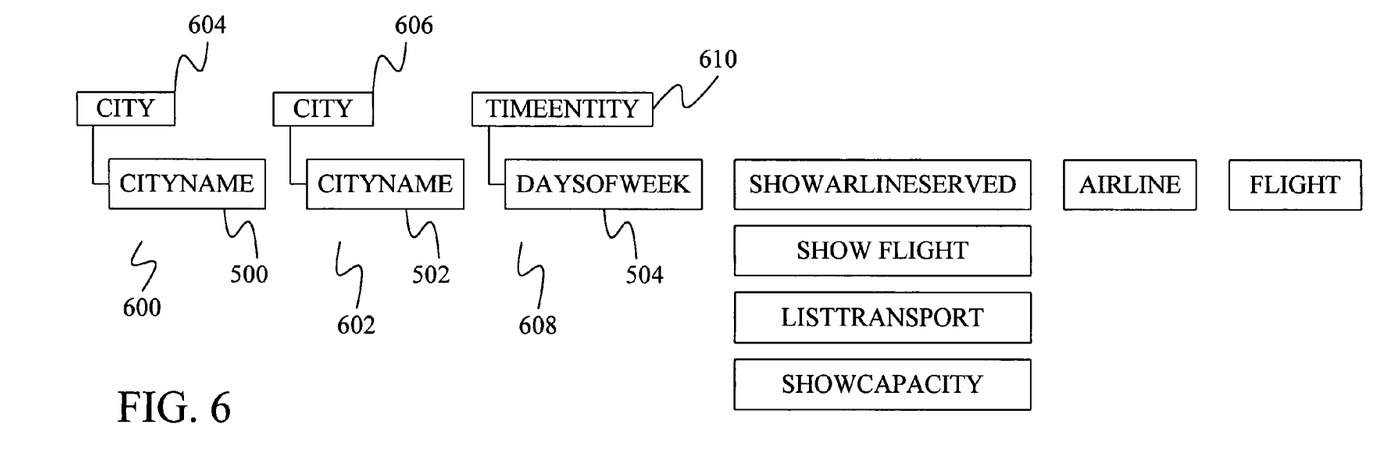
FIG. 6 is a diagram showing the effects of various semantic rules on the semantic entities of FIG. 5.

FIG. 6 shows the results of performing the grammar rules found in FIG. 4 on the entity lattice of FIG. 5. Specifically, the grammar rule found within <GrammarRule> tags 424 and 426 has been applied to "CityName" entities 500 and 502. This produces "City" semantic structures 600 and 602 with parent "City" entities 604 and 606 and child "CityName" entities 500 and 502. The grammar rule within <GrammarRule> tags 420 and 422 has been applied to "DaysofWeek" entity 504 to produce a "TimeEntity" structure 608 with a "TimeEntity" parent node 610 and a "DaysofWeek" child entity 504.

After the semantic rules have executed, the first two semantic nodes are selected at step 310. Under most embodiments, this involves selecting the two left-most semantic nodes.

Figure 2:
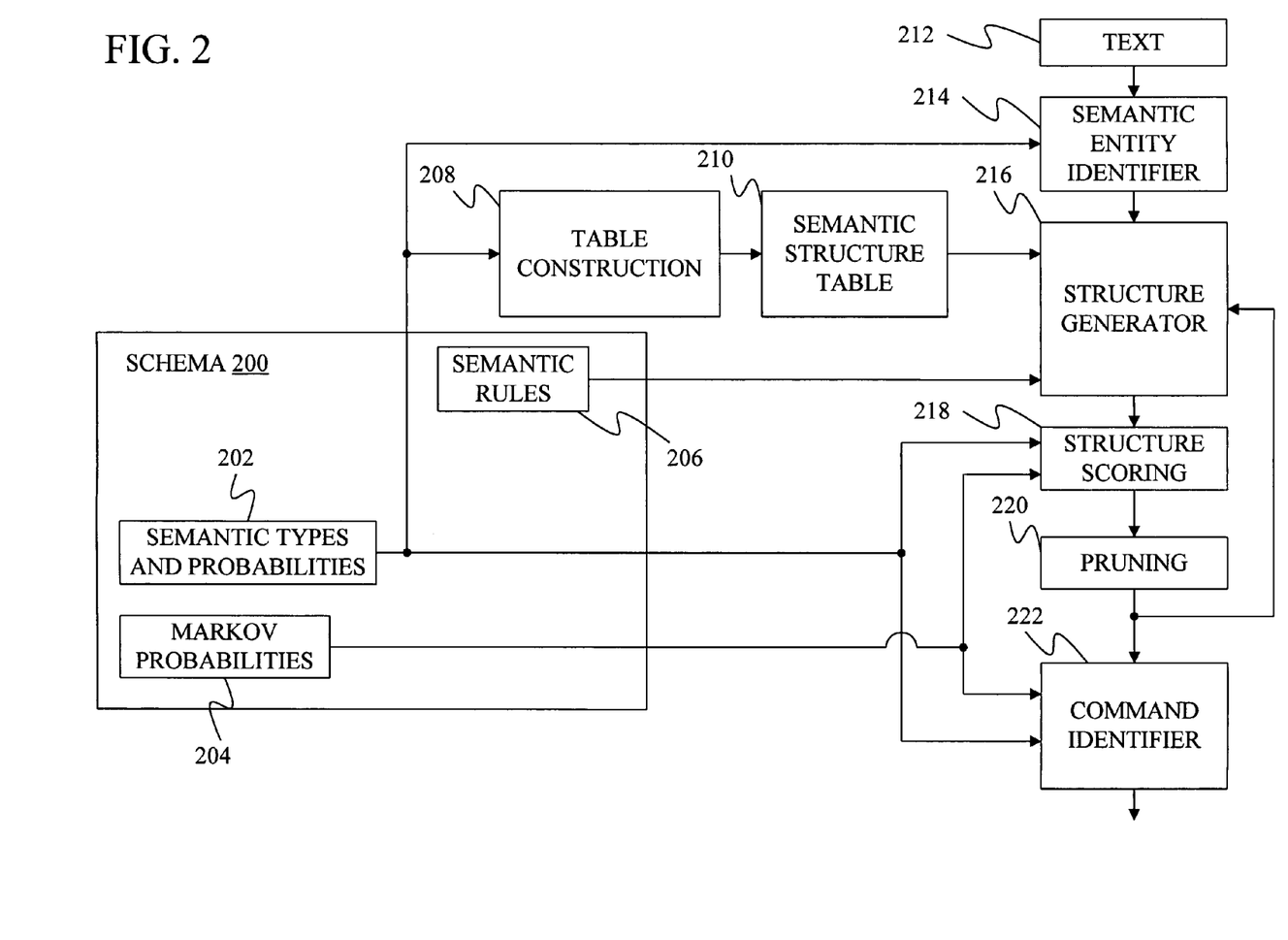
FIG. 2 is a block diagram of a system for identifying semantic structures from an input text.

At step 312, a structure generator 216 uses semantic structure table 210 to identify all of the possible structures that can be formed using the entities listed for the two selected semantic nodes. For example, if the first node contains entities A and B and the second node contains entities C and D, separate structures are identified for the entity pairs AC, AD, BC and BD. Note that multiple structures may be identified for each entity pair. This process can be performed quickly at run time because the possible structures for each entity pair have been previously identified and stored in structure table 210.

Figure 7:
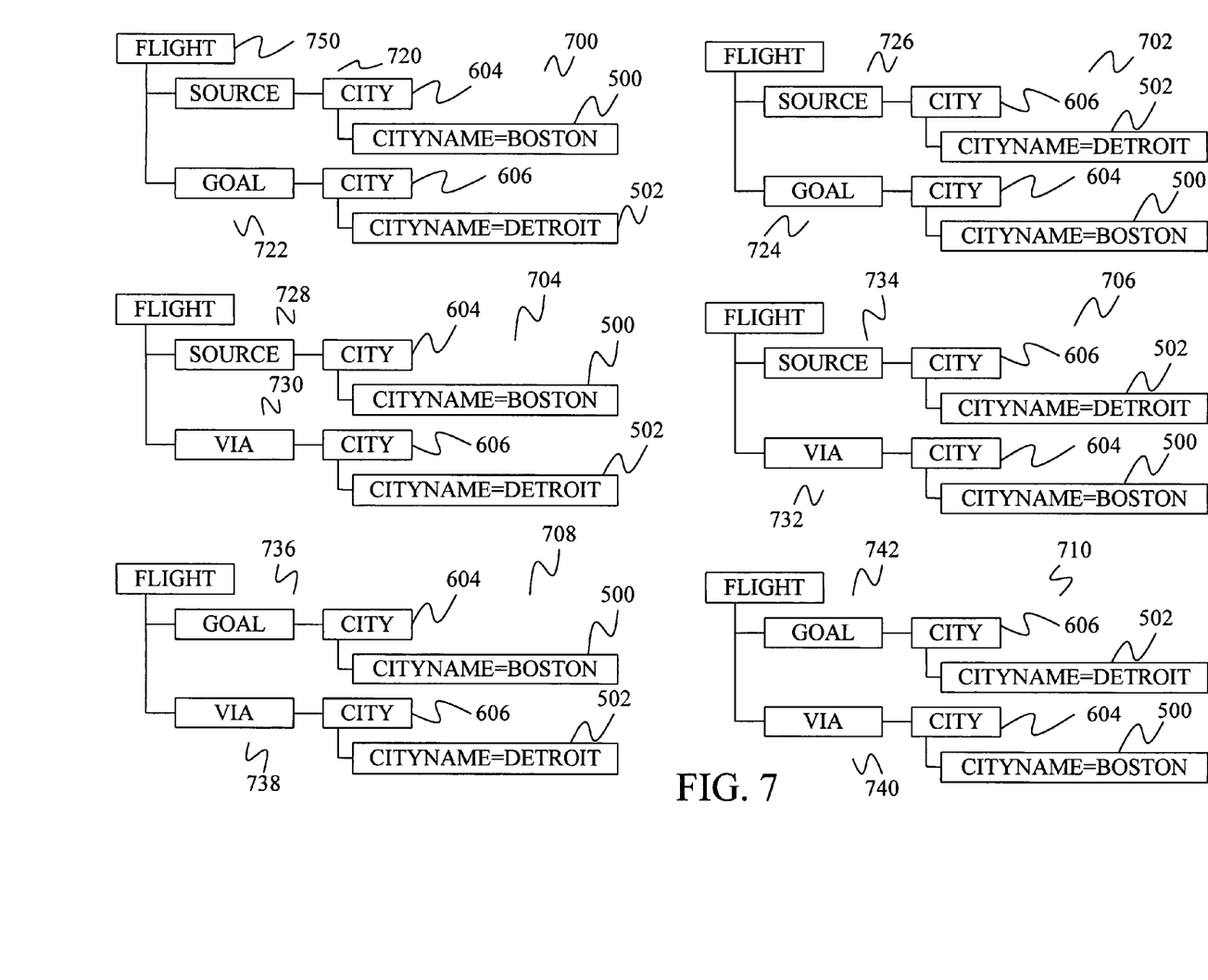
FIG. 7 is a diagram of initial semantic structures formed from the first two semantic entities of FIG. 5.

Examples of structures generated from the first two entities of the modified entity lattice of FIG. 6 are shown in FIG. 7. Since there is only one entity for each of the first two semantic nodes in FIG. 6, there is only one entity pair to consider. However, the structure generator has identified six separate structures that can be formed with this single entity pair. Specifically, six "Flight" semantic structures 700, 702, 704, 706, 708, and 710 are identified.

Although all of the identified semantic structures are "Flight" structures, they each use "City" semantic structure 600 (consisting of "City" entity 604 and "CityName=Boston" entity 500) and "City" semantic structure 602 (consisting of "City" entity 606 and "CityName=Detroit" entity 502) to fill different slots in the "Flight" structure. Specifically, each "City" semantic structure can be used to fill one of three slots for the restricted entities "Source City", "Via City", and "Goal City" found in the "Flight" entity. The six "Flight" structures thus represent the six different possible assignment combinations for the two "City" semantic structures.

For example, in "Flight" structure 700, "City" entity 604 fills a "Source" city slot 720 and "City" entity 606 fills a "Goal" city slot 722. However, in "Flight" structure 702, "City" entity 604 fills a "Goal" city slot 724 and "City" entity 606 fills a "Source" city slot 726.

In "Flight" structure 704, "City" entity 604 fills a "Source" city slot 728 and "City" entity 606 fills a "Via" city slot 730 while in "Flight" structure 706, "City" entity 604 fills a "Via" city slot 732 and "City" entity 606 fills a "Source" city slot 734.

Lastly, in "Flight" structure 708, "City" entity 604 fills a "Goal" city slot 736 and "City" entity 606 fills a "Via" city slot 738 while in "Flight" structure 710, "City" entity 604 fills a "Via" city slot 740 and "City" entity 606 fills a "Goal" city slot 742.

In the semantic structures of FIG. 7, the "Flight" entity is a parent entity to each of the city entities in that each city entity is listed in a <With> tag within the definition of the "Flight" entity. Thus, each city entity is a child entity that is considered to be beneath the "Flight" entity in the semantic structure.

After all of the possible structures for the two nodes have been created, the structures are provided to a structure scoring module 218, which scores each structure at step 314. Under the present invention, the score for each structure is the product of three semi-orthogonal scores. One of these scores is based on the likelihood of the semantic structure, another of the scores is based on the order in which semantic entities were expressed in the input text, and the last score is based on the syntactic correctness of the semantic structure.

The first score is referred to as a semantic score and is calculated as:

$$Semscore = \prod_{E_j \in S} p(E_j) \prod_{c_i \in C_E} p(c_i | E_j) \qquad \text{Eq. 1}$$

where $E_j$ are the separate entities in the entity structure S, $C_E$ is all of the children entities of entity $E_j$, $p(E_j)$ is the probability of entity $E_j$ and $p(c_i|E_j)$ is the probability of child entity $c_i$ given entity $E_j$.

The probabilities in the semantic probability are determined from the schema using the "seen" attributes in the <Entity> tags and the <With> tags. Specifically, the probability of an entity $p(E_j)$ is determined by dividing the value of the "Seen" attribute in the <Entity> tag for that entity by the sum of the values for "Seen" attributes in the <Entity> tags of all of the entities in the schema. The probability of a child entity given the parent entity $p(c_i|E_j)$ is determined by dividing the value of the "Seen" attribute in the <With> tag for the child entity by the value of the "Seen" attribute in the <Entity> tag of the parent entity.

In some embodiments of the present invention, the semantic score of Equation 1 is augmented with a penalty factor that is applied to reduce the probability of an entity if the entity was not derived directly from the text but instead was created to connect two entities that were derived from the text. For example, in FIG. 7, the probability of "Flight" entity 750 would be reduced by a penalty factor since the "Flight" entity was placed in the semantic structure to connect the two "city" entities and was not taken directly from the entity lattice produced from the text. In some embodiments, the penalty factor is 0.90.

The second score, which is based on the order in which the semantic entities are expressed in the input text, is referred to as a Markov score or a transition score. Under one embodiment, the Markov score is calculated as the product of transition probabilities for each pair of entities that are at the same level in the semantic structure. For example, the Markov probability for semantic structure 700 of FIG. 7 would be calculated as simply the transition probability for having a source city followed by a goal city. If there were another child node on the same level after the goal city, an additional transition probability would be determined for having a goal city followed by the additional entity.

The transition probability for a pair of same-level entities is determined from <TransitionProb> tags (denoted as Markov Probabilities 204 in FIG. 2) within schema 200. Examples of such <TransitionProb> tags are found in FIG. 4 as <TransitionProb> tags 430 and 432.

Within the <TransitionProb> tags the order of the entities is denoted using the "R1", "E1", "R2", and "E2" attributes. The "R1" and "E1" attributes identify the restriction and the entity, respectively, for the left-most entity of the two entities and the "R2" and "E2" attributes identify the restriction and the entity for the right-most entity of the two entities. Thus, the transition probability in <Transitionprob> tag 430 is for a Goal City followed by a Source City and the transition probability in <Transitionprob> tag 432 is for a Source City followed by a Goal City. Each <Transitionprob> tag also includes a "Seen" attribute, which indicates the number of times the two entities were found together in the order listed in the tag.

To determine a probability for a specific order of two entities, all of the <Transitionprob> tags that contain the two entities are located. (There will either be one or two such tags). The probability of a specific ordering of the two entities is determined by dividing the "Seen" value for that ordering by the sum of the "Seen" values for all of the <Transitionprob> tags that include the two entities. For example the probability of a Goal City followed by a Source City in FIG. 4 is calculated as 2/71 while the probability of a Source City followed by a Goal City is calculated as 69/71.

The product of the individual transition probabilities for each pair of same-level entities is then determined to form the Markov probability for the structure. Note that although only two-entity transition probabilities are used above, any number of entities may be used to determine the transition probabilities.

The last probability, which indicates the syntactic correctness of the semantic structure, is referred to as the syntactic score. This score can be generated in a number of different ways. Under one embodiment, a syntactic parse structure is formed based on the semantic structure. Specifically the words spanned by the entities in the semantic structure are placed in a syntactic structure in the same relative position as the entities in the semantic structure. A score for the resulting syntactic parse tree is then determined and used as the syntactic score for the semantic structure.

Under another embodiment of the present invention, the syntactic score is calculated by determining a separate score for each parent-child relationship in the semantic structure. For each parent-child relationship, the token position of the word or phrase that is spanned by the parent entity and the token position of the word or phrase that is spanned by the child entity are identified, where the token position is the number of tokens from the beginning of the sentence to the word or phrase. A token includes individual words or a phrase that operates as a single entity. For example, New York City is a single token.

The token positions are then used to identify a probability that describes the likelihood of a parent entity being at token position X when a child entity is at token position Y. Thus, the syntactic score is calculated as:

$$Synscore = \prod_{P_X C_Y} p(XY) \qquad \text{Eq. 2}$$

where $P_X$ is the set of all parent entities, $C_Y$ is the set of child entities for each parent entity, X is the token position of the parent entity and Y is the token position of the child entity.

The product of the semantic score, the Markov score, and the syntactic score is the full score for each semantic structure. By integrating these three semi-orthogonal scores, it is possible to identify semantic structures from even poorly formed text because although the candidate structures generated from such poorly formed sentences may have low syntactic scores, they will still be scored semantically and the semantic scores may be high enough for at least one of the structures to make it a viable semantic structure. In addition, by integrating a syntactic component and a semantic component of the score during the progressive building of the semantic structure, the present invention greatly reduces the amount of time needed to identify a semantic structure from the text.

After the semantic structures have been scored at step 314, one or more of the structures is pruned from consideration at step 316 by a pruning system 220. Such pruning can be performed by taking the top N semantic structures or by taking those semantic structures within a threshold of the top scoring semantic structure. For the example of FIG. 7, the top four semantic structures are retained. Specifically, structures 700, 704, 708, and 710 are retained.

After pruning, the lattice is examined at step 318 to determine if there are any other semantic nodes to process. If there are additional semantic nodes to process, the entities at the next node are combined with the retained semantic structures by structure generator 216 to form all possible combinations of the entities and the retained structures at step 320.

Under one embodiment, an ordered search is performed to determine how an entity can be attached to a semantic structure. First, a search is performed to find structures in which the new entity fits below any of the entities in the semantic structure. Next, a search is performed to find structures in which the head of the semantic structure fits beneath the new entity. Lastly, a search is performed to see if there is a common ancestor between the head of the semantic structure and the new entity. Each of these searches is performed using semantic structure table 210.

Figure 8:
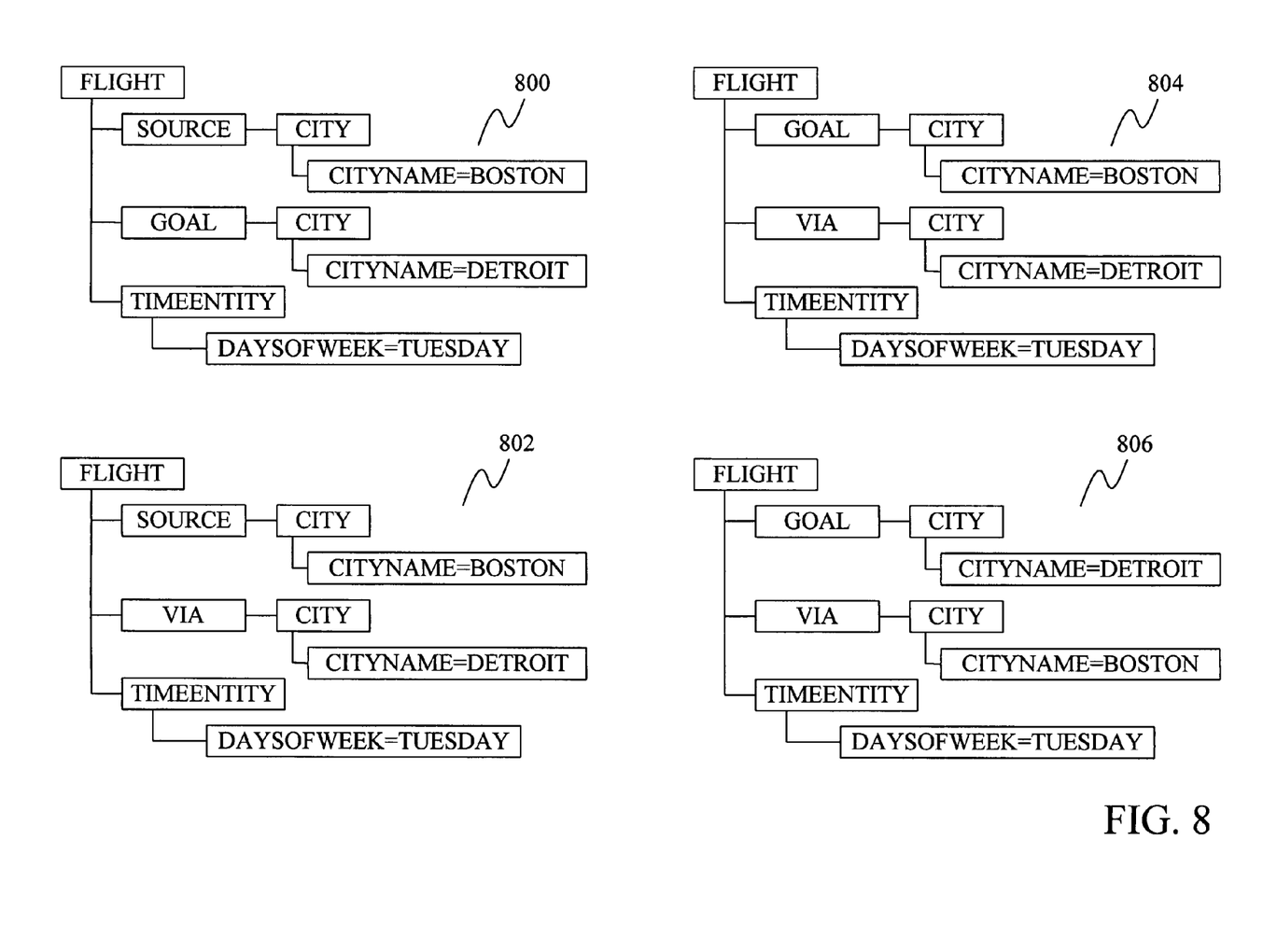
FIG. 8 is a diagram of the retained semantic structures with the addition of the TimeEntity semantic entity.

Examples of the new structures formed from the structures of FIG. 7 and the "TimeEntity" entity are shown in FIG. 8. Specifically, structures 800, 802, 804, and 806 have been formed from structures 700, 704, 708, and 710, respectively. In all of the structures, the "TimeEntity" entity has been added as a child node to the "Flight" entity.

Steps 314 and 316 are repeated to score each of the semantic structures and to prune the set of structures. Since there are only four structures in the example of FIG. 8, none of the structures are pruned.

Steps 318 and 320 are then performed to combine the structures of FIG. 8 with "ShowAirlineServed" entity 506, "ShowFlight" entity 508, "ListTransport" entity 510, and "ShowCapacity" entity 512 of the next semantic node.

Of the four entities at the next semantic node, only the "ShowFlight" entity can be combined with the structures of FIG. 8. In addition, the "ShowFlight" entity can only be combined to each of the structures such that the "ShowFlight" entity becomes the head of the structure with the "Flight" entity as its immediate child. This results in semantic structures 900, 902, 904, and 906 of FIG. 9, which correspond to structures 800, 802, 804, and 806 of FIG. 8.

Figure 9:
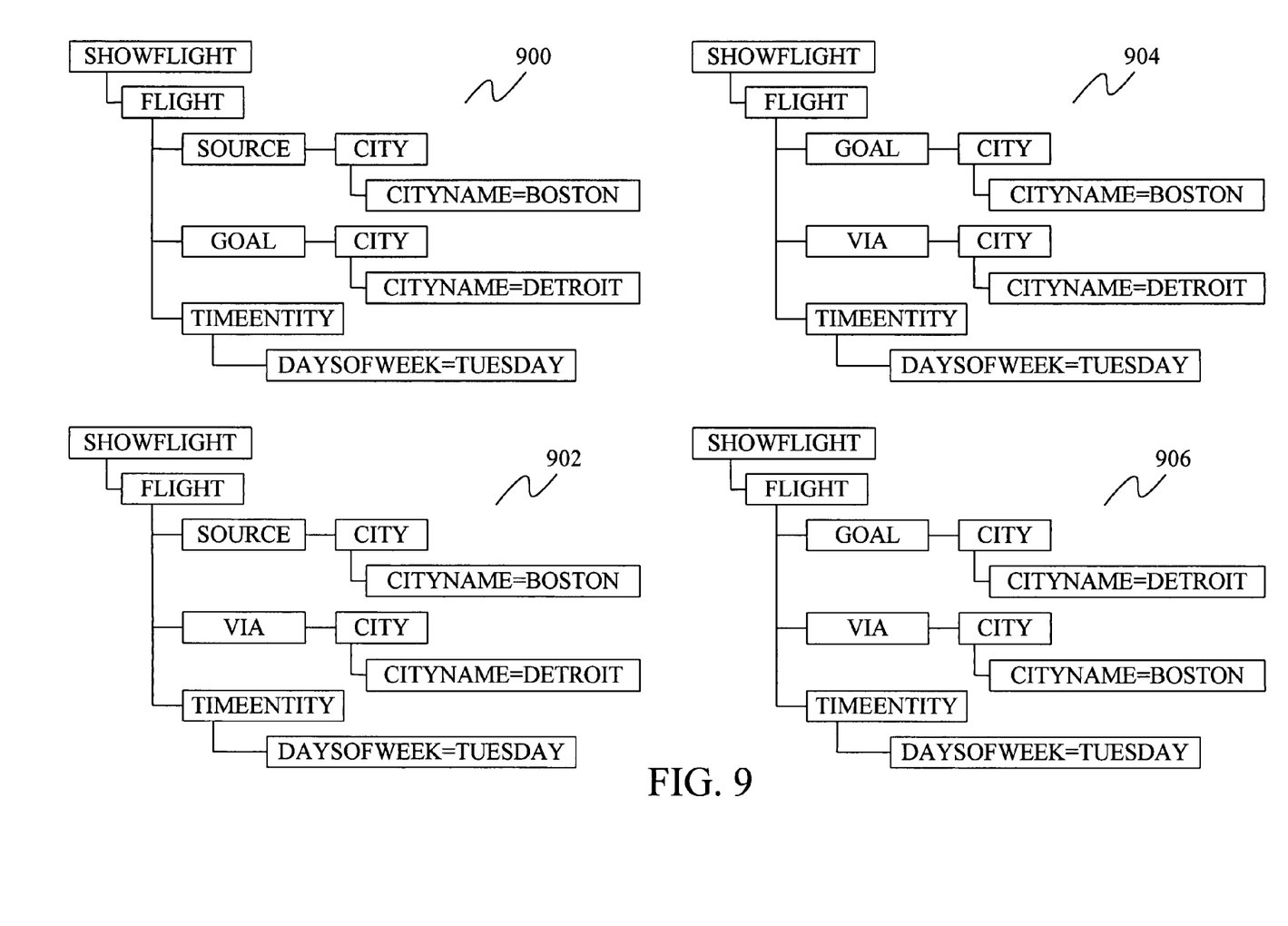
FIG. 9 is a diagram of the retained semantic structures with the addition of the ShowFlight entity.

Scoring and pruning steps 314 and 316 are repeated for new semantic structures 900, 902, 904, and 906 before determining that there are more semantic nodes to process at step 318. The "Airline" entity is then added to semantic structures 900, 902, 904, and 906 at step 320. For each of these structures, this involves adding the "Airline" entity as a child node to the "Flight" entity. The resulting structures are shown as semantic structures 1000, 1002, 1004, and 1006 in FIG. 10.

Figure 10:
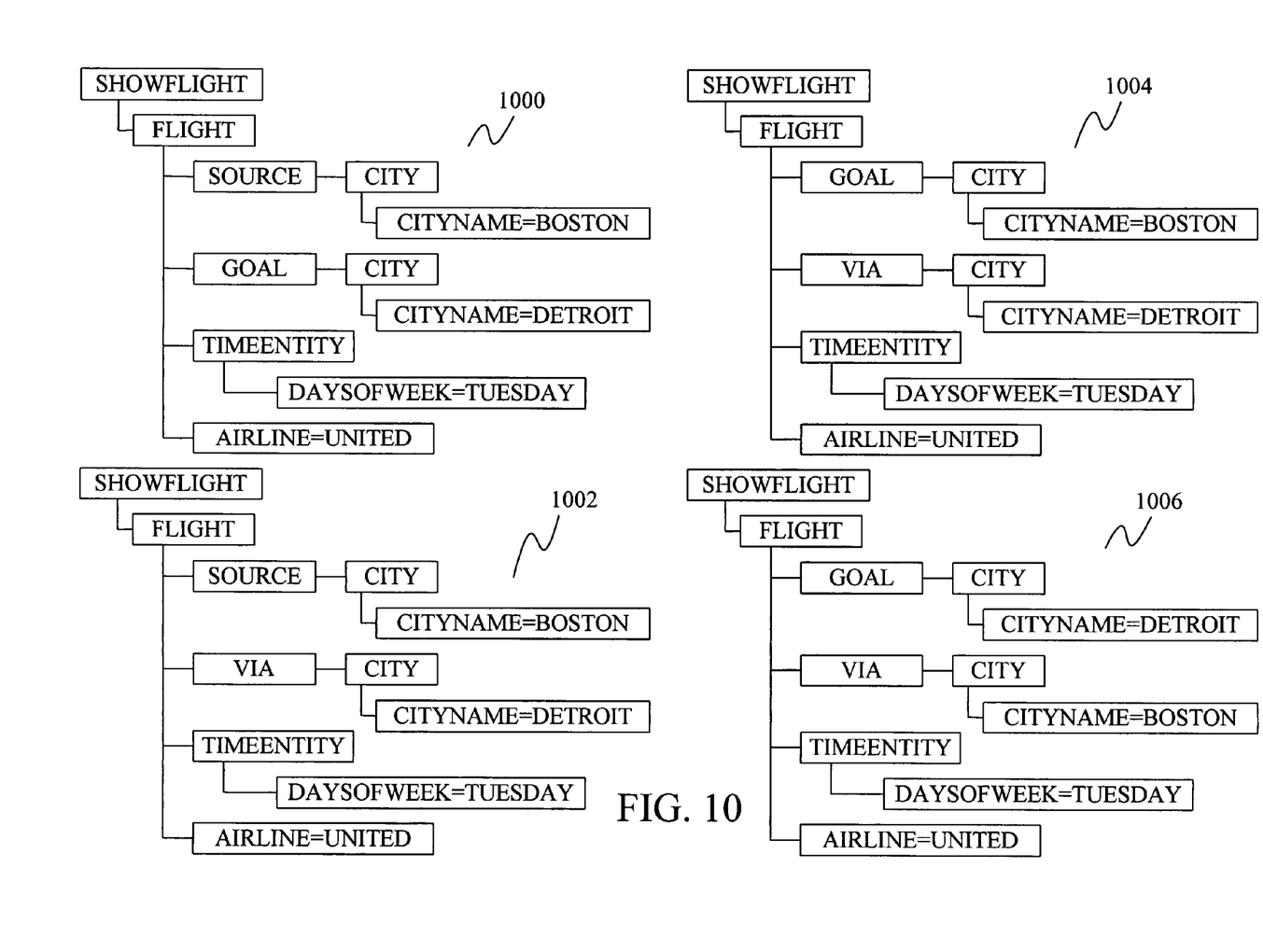
FIG. 10 is a diagram of the retained semantic structures with the addition of the Airline and Flight entities.

Steps 314, 316 and 318 are then repeated for the new structures before adding the "Flight" entity to the structures of FIG. 10. Since a "Flight" entity was created to connect the two city entities, a "Flight" entity does not need to be added to the structures. However, the fact that a "Flight" entity was found in the lattice means that the scores for the semantic structures no longer include a penalty factor for the creation of the "Flight" entity.

After scoring and pruning the new structures, there are no more semantic nodes to process at step 318 and the process of FIG. 3 continues at step 322 where the highest-scoring structure is examined by a command identifier 222 to determine if it is a command structure. A command structure will be headed by an entity with a "Command" attribute that has been set to "True" in schema 200. If the highest-scoring semantic structure is a command structure, the structure is returned at step 324 as the command represented by the text.

If the highest-scoring semantic structure is not a command entity at step 322, command identifier 222 attempts to identify commands that can accept the highest-scoring structure at step 326. The highest-scoring structure is then incorporated into each of these command structures and the command structures are scored at step 328. The highest-scoring command structure is then returned as the command represented by the text.

Although the present invention has been described with reference to particular embodiments, workers skilled in the art will recognize that changes may be made in form and detail without departing from the spirit and scope of the invention. In particular, the scoring functions may be modified or combined within the scope of the present invention.

What is claimed is:

1. A method of identifying a semantic structure from a text, the method comprising:

identifying two semantic entities from a first portion of the text;

a processor searching a table using the two semantic entities to locate an entry that lists all entities that connect the two semantic entities to form a semantic structure;

the processor forming a candidate semantic structure, wherein the candidate semantic structure comprises a parent semantic entity taken from the entry of the table where the parent semantic entity was not identified from the text and where the two semantic entities identified from the text are child semantic entities of the parent semantic entity in the candidate semantic structure;

generating a semantic score for the candidate semantic structure based on the probability of a child semantic entity given a parent semantic entity in the candidate semantic structure;

applying a penalty factor to the semantic score because the parent semantic entity was not identified from the text;

generating a transition score for the candidate semantic structure by generating a separate transition probability for each pair of semantic entities that appear on a same level in the candidate semantic structure wherein generating a transition probability comprises dividing a count of the number of times the pair of semantic entities appear in a particular order on the same level in training data by a count of the number of times the pair of semantic entities appear on the same level in the training data;

generating a syntactic score for the candidate semantic structure based in part on the position of a word in the text and the position in the semantic structure of a semantic entity formed from the word;

combining the syntactic score, the transition score, and the semantic score to form a combined score for the candidate semantic structure;

deciding not to prune the candidate semantic structure from further consideration based on the combined score;

identifying the parent semantic entity from a second portion of the text;

removing the penalty factor from the semantic score for the candidate semantic structure because the parent semantic entity has been identified from the text;

combining the syntactic score, the transition score, and the semantic score with the penalty factor removed to form a new combined score for the candidate semantic structure; and deciding not to prune the candidate semantic structure from further consideration based on the new combined score.

2. The method of claim 1 wherein generating a syntactic score comprises for each parent-child relationship between semantic entities in the candidate semantic structure, identifying a token position of a word associated with a parent semantic entity and identifying a token position of a word associated with a child semantic entity and determining a probability based on the token positions.

3. The method of claim 1 wherein identifying semantic entities comprises using a schema in which text is associated with semantic entities.

4. The method of claim 3 wherein a single word is associated with multiple semantic entities in the schema.

5. The method of claim 3 wherein using semantic entities to form a semantic structure comprises basing the semantic structure on relationships between semantic entities that are defined in a schema.

6. The method of claim 5 wherein the schema that defines the relationships between semantic entities and the schema that associates text with semantic entities is the same schema.

7. The method of claim 1 further comprising combining the candidate semantic structure with a further semantic entity identified from the text to form an expanded semantic structure.

8. The method of claim 7 further comprising generating a semantic score and a syntactic score for the expanded semantic structure.

9. The method of claim 7 wherein combining the candidate semantic structure with a further semantic entity comprises performing an ordered search comprising:

determining if the further semantic entity can be placed beneath any of the entities in the candidate semantic structure;

determining if a head of the candidate semantic structure can be placed beneath the further semantic entity; and determining if there is a common ancestor entity that both the further semantic entity and the head of the candidate semantic structure can be placed beneath.

10. The method of claim 1 further comprising:
determining that the candidate semantic structure is not a command semantic structure;
placing the candidate semantic structure in a command semantic structure; and
identifying the command semantic structure as the semantic structure of the text.

11. The method of claim 10 further comprising placing the candidate semantic structure in multiple command semantic structures.

12. The method of claim 11 further comprising scoring each command semantic structure and selecting a highest scoring command semantic structure as the semantic structure of the text.

* * * * *